United States Patent
Li et al.

(10) Patent No.: US 10,070,467 B2
(45) Date of Patent: Sep. 4, 2018

(54) RADIO BEARER ESTABLISHMENT METHOD, APPARATUS, AND SYSTEM

(71) Applicant: HUAWEI TECHNOLOGIES CO., LTD., Shenzhen (CN)

(72) Inventors: Yue Li, Shenzhen (CN); Xiaolong Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 584 days.

(21) Appl. No.: 14/620,752

(22) Filed: Feb. 12, 2015

(65) Prior Publication Data
US 2015/0163834 A1 Jun. 11, 2015

Related U.S. Application Data

(63) Continuation of application No. PCT/CN2012/080325, filed on Aug. 17, 2012.

(51) Int. Cl.
*H04W 76/34* (2018.01)
*H04W 76/02* (2009.01)
(Continued)

(52) U.S. Cl.
CPC ......... *H04W 76/02* (2013.01); *H04W 72/048* (2013.01); *H04W 76/10* (2018.02); *H04W 88/04* (2013.01)

(58) Field of Classification Search
None
See application file for complete search history.

(56) References Cited

U.S. PATENT DOCUMENTS

2004/0253962 A1* 12/2004 Ganti ............... H04W 48/20
455/452.1
2008/0049657 A1* 2/2008 Feng ............... H04B 7/26
370/315
(Continued)

FOREIGN PATENT DOCUMENTS

CN 102271070 12/2011
CN 102404702 4/2012
(Continued)

OTHER PUBLICATIONS

PCT International Search Report dated May 16, 2013 in corresponding International Patent Application No. PCT/CN2012/080325.
(Continued)

*Primary Examiner* — Lester Kincaid
*Assistant Examiner* — Edward Zhang
(74) *Attorney, Agent, or Firm* — Staas & Halsey LLP

(57) ABSTRACT

Embodiments of the present invention provide a radio bearer establishment method, apparatus, and system. The method includes: determining, by an MME, according to a pairing identifier of a UE or user information of a UE or received synthetic communication UE information, an RB of a benefited user equipment UE that performs synthetic communication and a corresponding support UE; and sending synthetic communication indication information to a base station, where the synthetic communication indication information includes information about the RB of the benefited UE that performs the synthetic communication and about the corresponding support UE, so that the base station separately sends corresponding synthetic RB configuration information to the benefited UE and the support UE according to the synthetic communication indication information, and the benefited UE and the support UE establish a corresponding synthetic RB.

16 Claims, 5 Drawing Sheets

---

An MME determines that a deleted support UE is to be released from a synthetic communication group — 501

The MME sends, to a base station, a release indication that instructs release of the deleted support UE from the synthetic communication group, so that the base station separately sends, according to the release indication, corresponding synthetic RB information to a benefited UE and the deleted support UE in the synthetic communication group, and updates or releases a corresponding synthetic RB, thereby forming a new synthetic communication group in which the deleted support UE is released, to perform the synthetic communication — 502

(51) Int. Cl.
*H04W 72/04* (2009.01)
*H04W 76/10* (2018.01)
*H04W 88/04* (2009.01)

(56) References Cited

U.S. PATENT DOCUMENTS

| | | | |
|---|---|---|---|
| 2011/0070833 A1 | 3/2011 | Perkins et al. | |
| 2013/0157679 A1* | 6/2013 | Van Phan | H04W 76/14 455/452.2 |
| 2013/0212236 A1* | 8/2013 | Foti | H04W 4/70 709/221 |
| 2013/0287012 A1* | 10/2013 | Pragada | H04W 76/045 370/338 |
| 2014/0302793 A1 | 10/2014 | Ma et al. | |

FOREIGN PATENT DOCUMENTS

| | | |
|---|---|---|
| CN | 102469410 | 5/2012 |
| WO | WO 2011/150710 A1 | 12/2011 |

OTHER PUBLICATIONS

Chinese Office Action dated Aug. 22, 2016 in corresponding Chinese Patent Application No. 201280035587.9.

"3$^{rd}$ Generation Partnership Project; Technical Specification Group Radio Access Network; Evolved Universal Terrestrial Radio Access (E-UTRA); Medium Access Control (MAC) protocol specification (Release 10)", 3GPP TS 36.321, V10.5.0, Mar. 2012, pp. 1-54.

"3$^{rd}$ Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.0.0, Jun. 2012, pp. 1-302.

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401, V11.2.0, Jun. 2012, pp. 1-285.

"3$^{rd}$ Generation Partnership Project; Technical Specification Group Core Network and Terminals; Mobile radio interface Layer 3 specification; Core network protocols; Stage 3 (Release 11)", 3GPP TS 24.008, V11.3.0, Jun. 2012, pp. 1-670.

* cited by examiner

RADIO BEARER ESTABLISHMENT METHOD, APPARATUS, AND SYSTEM

CROSS-REFERENCE TO RELATED APPLICATIONS

This application is a continuation of International Application No. PCT/CN2012/080325, filed on Aug. 17, 2012, which is hereby incorporated by reference in its entirety.

TECHNICAL FIELD

The present invention relates to the communications field, and in particular, to a radio bearer (RB, Radio Bearer) establishment method, apparatus, and system.

BACKGROUND

A UE (user equipment) may upload and download various data by using a data communications service provided by a mobile communication system. In the prior art, CoMP (coordinated multipoint) transmission is generally used to improve data transmission reliability of a UE that is at a cell edge, and CA (carrier aggregation) is used to improve a throughput rate of the UE. Data communication means in the foregoing method are all performed for a single UE. Once an environment in which the UE itself is situated deteriorates, the data transmission reliability and/or the throughput rate of the UE sharply drops.

A multiple user equipment synthetic communications technology has been discussed in an academic circle, that is, data is first sent to a UE that has a best channel condition and is adjacent to a destination UE, and then the UE forwards the data to a final destination UE by means of short-distance communication of any standard. For ease of description, the final destination UE to which downlink data flows is called a benefited UE and the UE that forwards the data is called a support UE. In this way, multiple UEs perform communication in a synthetic manner, even if an environment in which the benefited UE itself is situated deteriorates and a channel condition is very poor, the data that is forwarded by the support UE having a good channel condition can still be reliably received without affecting a throughput rate and reliability of the benefited UE.

During a process of performing the foregoing synthetic communication, a synthetic RB that is corresponding to the benefited UE and the support UE needs to be established. In the prior art, a conventional RB established by each UE cannot be used to implement the forgoing multiuser synthetic communication.

SUMMARY

Embodiments of the present invention provide a radio bearer establishment method, apparatus, and system, which can implement multiuser synthetic communication.

According to a first aspect, the present invention provides an RB establishment method, where the method is applied to a side of an MME and includes:

determining, by an MME according to a pairing identifier of a UE or user information of a UE or received synthetic communication UE information, an RB of a benefited user equipment UE that performs synthetic communication and a corresponding support UE; and sending, by the MME, synthetic communication indication information to a base station, where the synthetic communication indication information includes information about the RB of the benefited UE that performs the synthetic communication and about the corresponding support UE, so that the base station separately sends corresponding synthetic RB configuration information to the benefited UE and the support UE according to the synthetic communication indication information, and the benefited UE and the support UE establish a corresponding synthetic RB, thereby enabling the benefited UE and the support UE to form a synthetic communication group to perform the synthetic communication.

In a first possible implementation manner, the determining, by an MME according to a pairing identifier of a UE, an RB of a benefited UE that performs synthetic communication and a corresponding support UE includes:

receiving, by the MME, a non-access stratum NAS message sent by a UE, where the NAS message carries a pairing identifier of the UE; and determining, by the MME, that UEs with a same pairing identifier are the benefited UE that performs the synthetic communication and the corresponding support UE, to further determine the RB of the benefited UE that performs the synthetic communication and the corresponding support UE.

In a second possible implementation manner, the determining, by an MME according to user information of a UE, an RB of a benefited UE that performs synthetic communication and a corresponding support UE includes:

receiving, by the MME, an NAS message that carries a synthetic communication request and is sent by at least two UEs; and determining, by the MME according to user information of the at least two UEs, the RB of the benefited UE that performs the synthetic communication and the corresponding support UE; or determining, by the MME according to user information that is of all UEs and stored in the MME itself, the RB of the benefited UE that performs the synthetic communication and the corresponding support UE, where the user information of UE includes at least one piece of the following information: capability information, location information, and subscription information of UE, and information about a serving base station to which UE belongs.

In a third possible implementation manner, the determining, by an MME according to received synthetic communication UE information, an RB of a benefited UE that performs synthetic communication and a corresponding support UE includes:

receiving, by the MME, the synthetic communication UE information sent by a packet data network gateway P-GW, where the synthetic communication UE information includes the RB of the benefited UE that performs the synthetic communication, or the synthetic communication UE information includes information about the RB of the benefited UE that performs the synthetic communication and about the corresponding support UE; where if the synthetic communication UE information includes information about the RB of the benefited UE that performs the synthetic communication, the MME determines, according to the user information that is of a UE and stored in the MME itself, the support UE that is corresponding to the RB of the benefited UE that performs the synthetic communication; and if the synthetic communication UE information includes the information about the RB of the benefited UE that performs the synthetic communication and about the corresponding support UE, the MME directly determines, according to the synthetic communication UE information, the RB of the benefited UE that performs the synthetic communication and the corresponding support UE, where the user information includes at least one piece of the following information: capability information, location information, and subscription information of the UE, and information about a serving base station to which the UE belongs.

With reference to the first aspect, the first possible implementation manner, the second possible implementation manner, and the third possible implementation manner of the first aspect, in a fourth possible implementation manner, the method further includes:

receiving, by the MME, an adding message sent by a newly-added support UE, where the adding message carries the synthetic communication request and the pairing identifier; and determining, by the MME according to the pairing identifier, that the newly-added support UE is to be added to the corresponding synthetic communication group; or determining, by the MME according to user information that is of a newly-added support UE and stored in the MME itself, that the newly-added support UE is to be added to the corresponding synthetic communication group, where the user information includes at least one piece of the following information: capability information, location information, and subscription information of the UE, and information about a serving base station to which the UE belongs; and sending, by the MME to the base station, an adding indication that instructs adding of the newly-added support UE to the synthetic communication group, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form a new synthetic communication group to perform the synthetic communication.

With reference to the first aspect, the first possible implementation manner, the second possible implementation manner, the third possible implementation manner, and the fourth possible implementation manner of the first aspect, in a fifth possible implementation manner, the method further includes:

receiving, by the MME, a release message sent by a deleted support UE, where the release message carries a synthetic bearer release request and the pairing identifier; and releasing, by the MME, the deleted support UE from the synthetic communication group according to the synthetic bearer release request and the pairing identifier; or determining, by the MME according to user information that is of a deleted support UE and stored in the MME itself, that the deleted support UE is released from the synthetic communication group, where the user information includes at least one piece of the following information: capability information, location information, and subscription information of the UE, and information about a serving base station to which the UE belongs; and sending, by the MME to the base station, a release indication that instructs release of the deleted support UE from the synthetic communication group, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

The method provided by the first aspect is applied to a side of a base station, including:

receiving, by a base station, synthetic communication indication information sent by an MME, where the synthetic communication indication information includes information about an RB of a benefited UE that performs synthetic communication and about a corresponding support UE;

separately sending, by the base station, corresponding synthetic RB configuration information to the benefited UE and the support UE according to the synthetic communication indication information, and establishing a corresponding synthetic RB, thereby enabling the benefited UE and the support UE to form a synthetic communication group to perform the synthetic communication;

further receiving, by the base station, an adding indication that is sent by the MME and instructs adding of a newly-added support UE to the synthetic communication group; and separately sending, the corresponding synthetic RB configuration information to the benefited UE in the synthetic communication group and the newly-added support UE according to the adding indication, and updating or establishing the corresponding synthetic RB, thereby enabling the newly-added support UE and the synthetic communication group to form a new synthetic communication group to perform the synthetic communication; and further receiving, by the base station, a release indication that is sent by the MME and instructs release of a deleted support UE from the synthetic communication group; and separately sending, according to the release indication, the corresponding synthetic RB configuration information to the benefited UE and the deleted support UE in the synthetic communication group, and updating or releasing the corresponding synthetic RB, thereby forming a new synthetic communication group to perform the synthetic communication.

According to a second aspect, the present invention further provides an MME, including:

a determining unit, configured to determine, according to a pairing identifier of a UE or user information of a UE or received synthetic communication UE information, a radio bearer RB of a benefited user equipment UE that performs synthetic communication and a corresponding support UE; and a sending unit, configured to send synthetic communication indication information to a base station, where the synthetic communication indication information includes information about the RB of the benefited UE that performs the synthetic communication and about the corresponding support UE, and the RB of the benefited UE that performs the synthetic communication and the corresponding support UE are determined by the determining unit, so that the base station separately sends corresponding synthetic RB configuration information to the benefited UE and the support UE according to the synthetic communication indication information, and updates or establishes a corresponding synthetic RB, thereby enabling the benefited UE and the support UE to form a synthetic communication group to perform the synthetic communication.

In a first possible implementation manner, the MME further includes:

a receiving unit, configured to receive a non-access stratum NAS message sent by a UE, where the NAS message carries a pairing identifier of the UE;

the determining unit is configured to determine that UEs, which are corresponding to a same pairing identifier in the pairing identifier received by the receiving unit, are the benefited UE that performs the synthetic communication and the corresponding support UE, to further determine the RB of the benefited UE that performs the synthetic communication and the corresponding support UE.

In a second possible implementation manner, the MME further includes:

a receiving unit, configured to receive an NAS message that carries a synthetic communication request and is sent by at least two UEs;

the determining unit is configured to determine, according to user information of the at least two UEs, the RB of the benefited UE that performs the synthetic communication and the corresponding support UE; or the determining unit is configured to determine, according to user information that is of all UEs and stored in the determining unit itself, the RB of the benefited UE that performs the synthetic communication and the corresponding support UE, where the user information of UE includes at least one piece of the following information: capability information, location information, and subscription information of UE, and information about a serving base station to which UE belongs.

In a third possible implementation manner, the MME further includes:

a receiving unit, configured to receive the synthetic communication UE information sent by a packet data network gateway P-GW, where the synthetic communication UE information includes the RB of the benefited UE that performs the synthetic communication, or the synthetic communication UE information includes information about the RB of the benefited UE that performs the synthetic communication and about the corresponding support UE; where if the synthetic communication UE information includes the RB of the benefited UE that performs the synthetic communication, the determining unit determines, according to the user information that is of a UE and stored in the determining unit itself, the support UE that is corresponding to the RB of the benefited UE that performs the synthetic communication, where the RB of the benefited UE is included in the synthetic communication UE information received by the receiving unit; and if the synthetic communication UE information includes the information about the RB of the benefited UE that performs the synthetic communication and about the corresponding support UE, the MME directly determines, according to the synthetic communication UE information received by the receiving unit, the RB of the benefited UE that performs the synthetic communication and the corresponding support UE, where the user information includes at least one piece of the following information: capability information, location information, and subscription information of the UE, and information about a serving base station to which the UE belongs.

With reference to the second aspect, the first possible implementation manner, the second possible implementation manner, and the third possible implementation manner of the second aspect, in a fourth possible implementation manner, the receiving unit is further configured to receive an adding message sent by a newly-added support UE, where the adding message carries the synthetic communication request and the pairing identifier; and the MME determines, according to the pairing identifier, that the newly-added support UE is to be added to the corresponding synthetic communication group; and the determining unit is further configured to determine, according to the pairing identifier received by the receiving unit, that the newly-added support UE is to be added to the corresponding synthetic communication group; or the determining unit is further configured to determine, according to user information that is of the newly-added support UE and stored in the determining unit itself, that the newly-added support UE is to be added to the corresponding synthetic communication group, where the user information includes at least one piece of the following information: capability information, location information, and subscription information of the UE, and information about a serving base station to which the UE belongs; and the sending unit is configured to send, to the base station, an adding indication that instructs adding of the newly-added support UE to the synthetic communication group, where the adding is determined by the determining unit, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form a new synthetic communication group to perform the synthetic communication.

With reference to the second aspect, the first possible implementation manner, the second possible implementation manner, the third possible implementation manner, and the fourth possible implementation manner of the second aspect, in a fifth possible implementation manner, the receiving unit is further configured to receive a release message sent by a deleted support UE, where the release message carries a synthetic bearer release request and the pairing identifier; and the determining unit is further configured to determine the deleted support UE in the synthetic communication group according to the synthetic bearer release request and the pairing identifier that are received by the receiving unit; or the determining unit is configured to determine, according to user information that is of the deleted support UE and stored in the determining unit itself, that the deleted support UE is to be released from the synthetic communication group, where the user information includes at least one piece of the following information: capability information, location information, and subscription information of the UE, and information about a serving base station to which the UE belongs; and the sending unit is configured to send, to the base station, a release indication that instructs release of the deleted support UE from the synthetic communication group, where the release is determined by the determining unit, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

According to a third aspect, this present invention further provides a base station, including:

a receiving unit, configured to receive synthetic communication indication information sent by an MME, where the synthetic communication indication information includes information about an RB of a benefited UE that performs synthetic communication and about a corresponding support UE;

a configuring unit, configured to separately configure corresponding synthetic RB configuration information for the benefited UE and the support UE according to the synthetic communication indication information received by the receiving unit; and a sending unit, further configured to separately send the corresponding synthetic RB configuration information, which is configured by the configuring unit, to the benefited UE and the support UE, and establish a corresponding synthetic RB, thereby enabling the benefited UE and the support UE to form a synthetic communication group to perform the synthetic communication.

In a first possible implementation manner, the receiving unit is further configured to receive an adding indication that is sent by the MME and instructs adding of a newly-added support UE to the synthetic communication group;

the configuring unit is further configured to separately configure, according to the adding indication received by the receiving unit, the corresponding synthetic RB configuration information for the benefited UE and the support UE in the synthetic communication group and the newly-added support UE; and the sending unit is further configured to separately send the corresponding synthetic RB configuration information, which is configured by the configuring unit, to the benefited UE and the support UE in the synthetic communication group and the newly-added support UE, and update or establish the corresponding synthetic RB, thereby enabling the newly-added support UE and the synthetic communication group to form a new synthetic communication group to perform the synthetic communication.

With reference to the third aspect and the first possible implementation manner of the third aspect, in a second possible implementation manner, the receiving unit is further configured to receive a release indication that is sent by the MME and instructs release of a deleted support UE from the synthetic communication group;

the configuring unit is further configured to separately configure, according to the release indication received by the receiving unit, the corresponding synthetic RB configuration information for the benefited UE and the deleted support UE in the synthetic communication group; and the sending unit is further configured to separately send the corresponding synthetic RB configuration information, which is configured by the configuring unit, to the benefited UE and the deleted support UE in the synthetic communication group, and update or release the corresponding synthetic RB, thereby forming a new synthetic communication group to perform the synthetic communication.

According to a fourth aspect, the present invention further provides a radio bearer RB establishment system, and the system includes: an MME, a base station, and at least two UEs, where the MME is the foregoing MME, and the base station is the foregoing base station; and the at least two UEs are configured to receive corresponding synthetic RB configuration information sent by the base station, and establish a synthetic RB between the at least two UEs and the base station, thereby forming a synthetic communication group to perform synthetic communication.

According to the foregoing solutions, the MME determines, according to a pairing identifier of a UE or user information of a UE or received synthetic communication UE information, a benefited UE that performs synthetic communication and a corresponding support UE, and instructs the base station to establish a corresponding synthetic RB for the benefited UE and the support UE, so that data sent from a network side can be forwarded to the benefited UE by using a synthetic RB of the support UE and a short-distance communication protocol between UEs, and the benefited UE synthesizes, by using a synthetic layer in the corresponding synthetic RB, the data forwarded by the support UE with data received by the benefited UE itself, thereby implementing multiuser synthetic communication.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
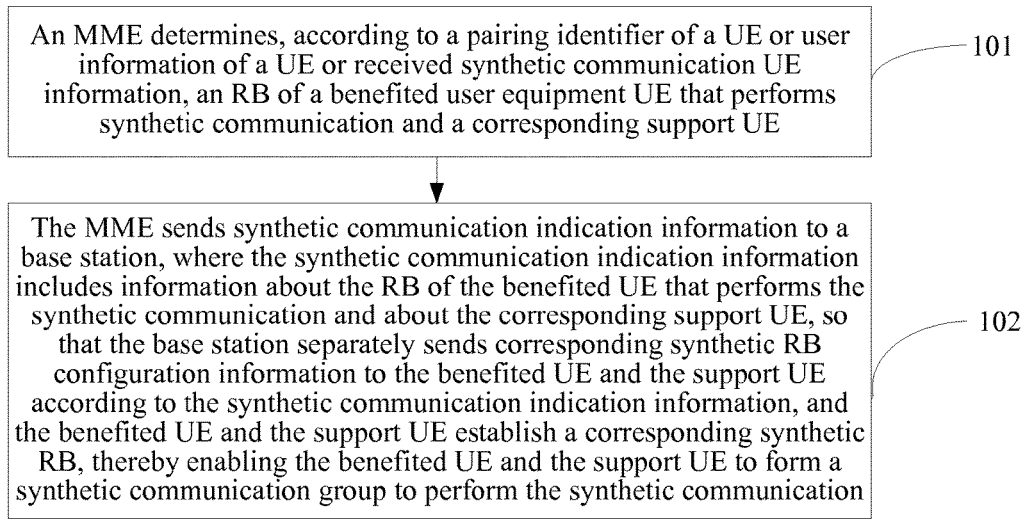
FIG. 1 is a schematic flowchart of an RB establishment method according to an embodiment of the present invention.

An embodiment of the present invention provides an RB establishment method. As shown in FIG. 1, the method includes the following steps:

101. An MME (mobility management entity) determines, according to a pairing identifier of a UE or user information of a UE or received synthetic communication UE information, an RB of a benefited user equipment UE that performs synthetic communication and a corresponding support UE.

During a process of normal communication over a conventional network, if a UE needs to perform such a service as uploading data after entering an access network, the UE sends, to the MME, an NAS message that requests bearer establishment. After receiving the NAS message, the MME instructs a base station to establish an RB for the UE, to perform a related service. If a location environment in which the UE is situated is poor and a signal is weak, the UE may perform multiuser synthetic communication as a benefited UE, and a support UE that has a strong signal and is adjacent to the benefited UE forwards information about the related service on a network to the benefited UE to perform the related service. If synthetic communication needs to be performed, the base station needs to separately establish a corresponding synthetic RB for the benefited UE and the support UE.

Herein, the MME needs to first determine the RB of the benefited UE that needs to perform the synthetic communication and the corresponding support UE. Optionally, the MME may determine, according to the pairing identifier of the UE or the user information of the UE or the received synthetic communication UE information, the RB of the benefited user equipment UE that performs the synthetic communication and the corresponding support UE. The MME may receive an NAS message that is actively sent by the UE, where the NAS message carries the pairing identifier, and the MME may determine, according to the pairing identifier, the RB of the benefited UE that performs the synthetic communication and the corresponding support UE; or the MME may determine, according to the user information that is of the UE and stored in the MME itself, the RB of the benefited UE that performs the synthetic communication and the corresponding support UE, where the user information of the UE includes capability information, location information, and subscription information of the UE, and information about a serving base station to which the UE belongs; or the MME may receive the synthetic communication UE information sent by a P-GW (PDN (Packet Data Network, packet data network) Gateway), and the MME may determine, according to the synthetic communication UE information, the RB of the benefited UE that performs the synthetic communication and the corresponding support UE.

102. The MME sends synthetic communication indication information to a base station, where the synthetic communication indication information includes information about the RB of the benefited UE that performs the synthetic communication and about the corresponding support UE, so that the base station separately sends corresponding synthetic RB configuration information to the benefited UE and the support UE according to the synthetic communication indication information, and the benefited UE and the support UE establish a corresponding synthetic RB, thereby enabling the benefited UE and the support UE to form a synthetic communication group to perform the synthetic communication.

After determining the RB of the benefited UE that needs to perform the synthetic communication and the corresponding support UE, the MME sends the synthetic communication indication information to the base station, where the synthetic communication indication information includes the information about the RB of the benefited UE that performs the synthetic communication and about the corresponding support UE. The base station separately sends the corresponding synthetic RB configuration information to the benefited UE and the support UE according to the synthetic communication indication information. After receiving the corresponding synthetic RB configuration information, the support UE directly establishes the corresponding synthetic RB according to the corresponding RB configuration information. After the benefited UE receives the corresponding synthetic RB configuration information, if the base station has established a conventional RB for the benefited UE that performs the related service, the conventional RB needs to be updated to the corresponding synthetic RB; and if the base station has not established the conventional RB for the benefited UE, the corresponding synthetic RB is directly established. In this way, the benefited UE and the support UE establish the corresponding synthetic RB to form the synthetic communication group, and the synthetic communication may be performed. In the synthetic communication group, a support UE that has a strong signal may receive, by using the corresponding synthetic RB, a part or all of data sent from a network side to the benefited UE, and then forward the data to the benefited UE by using a short-distance communication protocol between UEs. After receiving the forwarded data, the benefited UE synthesizes, by using a synthetic layer in the corresponding synthetic RB, the data forwarded by the support UE with data received by the benefited UE itself, so that a throughput rate and reliability can be increased.

Figure 2:
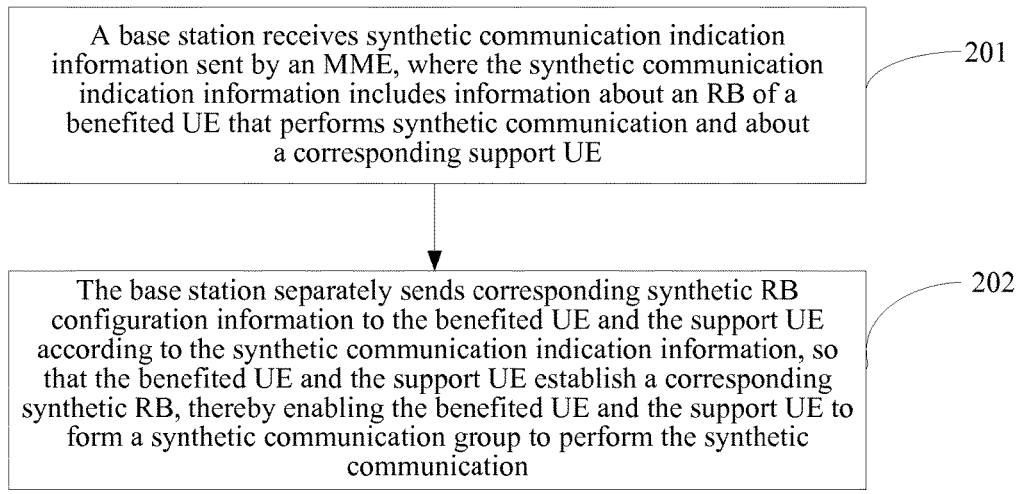
FIG. 2 is a schematic flowchart of another RB establishment method according to an embodiment of the present invention.

When the method provided by this embodiment of the present invention is applied to a base station, as shown in FIG. 2, the method includes the following steps:

201. The base station receives synthetic communication indication information sent by an MME, where the synthetic communication indication information includes information about an RB of a benefited UE that performs synthetic communication and about a corresponding support UE.

After performing the step 101 of determining the RB of the benefited UE that performs the synthetic communication and the corresponding support UE, the MME performs the step 102 of sending the synthetic communication indication information to the base station, where the synthetic communication indication information includes the information about the RB of the benefited UE that needs to perform the synthetic communication and about the corresponding support UE. Then, the base station receives the synthetic communication indication information.

202. The base station separately sends corresponding synthetic RB configuration information to the benefited UE and the support UE according to the synthetic communication indication information, so that the benefited UE and the support UE establish a corresponding synthetic RB, thereby enabling the benefited UE and the support UE to form a synthetic communication group to perform the synthetic communication.

The base station separately sends the corresponding synthetic RB configuration information to the benefited UE and the support UE according to the synthetic communication indication information. After receiving the corresponding synthetic RB configuration information, the support UE directly establishes the corresponding synthetic RB according to the corresponding RB configuration information. After the benefited UE receives the corresponding synthetic RB configuration information, if the base station has established a conventional RB for the benefited UE that performs a related service, the conventional RB needs to be updated to the corresponding synthetic RB; and if the base station has not established the conventional RB for the benefited UE, the corresponding synthetic RB is directly established. In this way, the benefited UE and the support UE establish the corresponding synthetic RB to form the synthetic communication group, and the synthetic communication may be performed. In the synthetic communication group, a support UE that has a strong signal may receive, by using the corresponding synthetic RB, a part or all of data sent from a network side to the benefited UE, and then forward the data to the benefited UE by using a short-distance communication protocol between UEs. After receiving the forwarded data, the benefited UE synthesizes, by using a synthetic layer in the corresponding synthetic RB, the data forwarded by the support UE with data received by the benefited UE itself, so that a throughput rate and reliability can be increased.

According to the RB establishment method provided by this embodiment of the present invention, the MME determines, according to a pairing identifier of a UE or user information of a UE or received synthetic communication UE information, a benefited UE that performs synthetic communication and a corresponding support UE, and instructs the base station to establish a corresponding synthetic RB for the benefited UE and the support UE, so that data sent from a network side can be forwarded to the benefited UE by using a synthetic RB of the support UE and a short-distance communication protocol between UEs, and the benefited UE synthesizes, by using a synthetic layer in the corresponding synthetic RB, the data forwarded by the support UE with data received by the benefited UE itself, thereby implementing multiuser synthetic communication.

Embodiment 2

Figure 3:
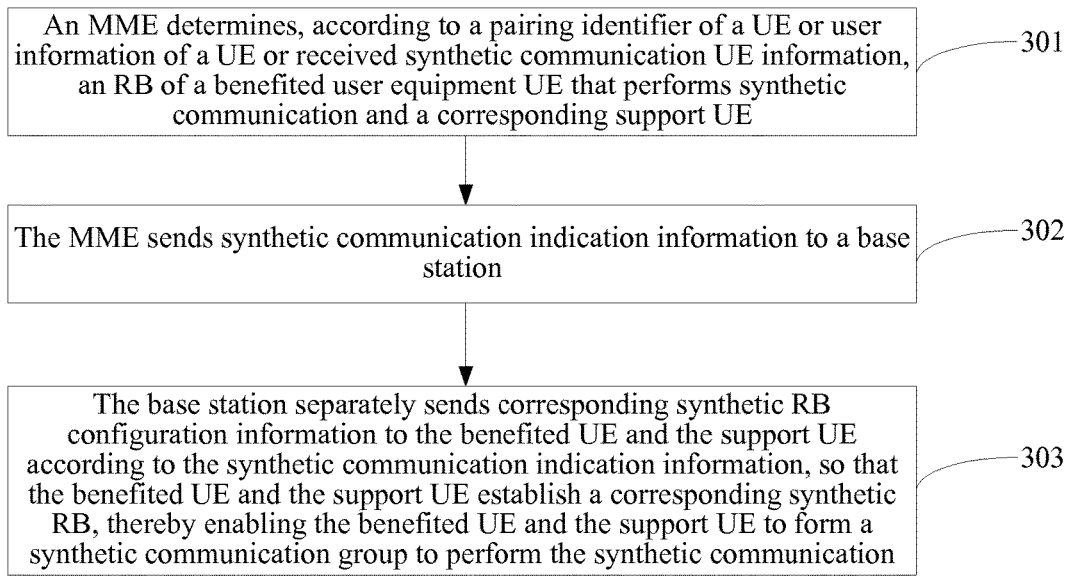
FIG. 3 is a schematic flowchart of an RB establishment method according to another embodiment of the present invention.

An embodiment of the present invention provides a radio bearer establishment method. As shown in FIG. 3, the method includes the following steps:

301. An MME determines, according to a pairing identifier of a UE or user information of a UE or received synthetic communication UE information, an RB of a benefited user equipment UE that performs synthetic communication and a corresponding support UE.

The determining, by an MME according to a pairing identifier of a UE, an RB of a benefited UE that performs synthetic communication and a corresponding support UE includes: receiving, by the MME, an NAS message sent by a UE, where the NAS message carries the pairing identifier of the UE; and determining, by the MME, that UEs with a same pairing identifier are the benefited UE that performs the synthetic communication and the corresponding support UE, to further determine the RB of the benefited UE that performs the synthetic communication and the corresponding support UE.

When the benefited UE needs to perform the synthetic communication, the benefited UE negotiates with a support UE, which is closer to the benefited UE, for the same pairing identifier to perform the synthetic communication. Then, the benefited UE or the support UE sends, to the MME, the NAS message that carries the pairing identifier. When the benefited UE or the support UE needs to establish a bearer, the NAS message used is a message that requests bearer establishment, such as an attach request (attach request) message or a service request (service request) message; and when no bearer needs to be established, the sent NAS message is a TAU (Track area update, track area update) message or a newly-added NAS message indicating that no bearer needs to be established. Generally, the benefited UE needs to establish a bearer, and the benefited UE sends, to the MME, the NAS message that requests bearer establishment, such as the attach request message or the service request message. The support UE may not have a requirement for bearer establishment and only serves as a support, and therefore the support UE sends, to the MME, the TAU message or the newly-added NAS message indicating that no bearer needs to be established. After receiving the NAS message sent by the benefited UE and the support UE, the MME matches the UEs, which have the same pairing identifier, as the benefited UE and the support UE that perform same synthetic communication, thereby determining the RB of the benefited UE that performs the synthetic communication and the corresponding support UE.

The determining, by an MME according to user information of a UE, an RB of a benefited UE that performs synthetic communication and a corresponding support UE includes two cases: in one case, the MME receives an NAS message that carries a synthetic communication request and is sent by at least two UEs, and the MME determines, according to user information of the at least two UEs, the RB of the benefited UE that performs the synthetic communication and the corresponding support UE; in the other case, the MME determines, according to user information that is of all UEs and stored in the MME itself, the RB of the benefited UE that performs the synthetic communication and the corresponding support UE, where the user information of UE includes at least one piece of the following information: capability information, location information, and subscription information of UE, and information about a serving base station to which UE belongs.

When the benefited UE needs to perform the synthetic communication, the benefited UE negotiates with the support UE that is closer to the benefited UE to perform the synthetic communication. Then, the benefited UE or the support UE sends, to the MME, the NAS message that carries the synthetic communication request, the MME may receive the NAS message that carries the synthetic communication request and is sent by the at least two UEs, and the MME may determine, according to the user information of the at least two UEs, the RB of the benefited UE that performs the synthetic communication and the corresponding support UE, where the user information of the UEs is obtained by the MME from an HSS (Home Subscriber Server, home subscriber server). Certainly, no matter whether the MME receives the NAS message that carries the synthetic communication request and is sent by the UEs, the MME determines, according to the user information that is of the all UEs and stored in the MME itself, the RB of the benefited UE that performs the synthetic communication and the corresponding support UE, where the user information of UE includes at least one piece of the following information: capability information, location information, and subscription information of UE, and information about a serving base station to which UE belongs. The capability information of a UE indicates whether the UE has a synthetic communication function. In addition, the MME needs to ensure that the benefited UE that performs the synthetic communication and the support UE belong to a same serving base station. The MME may determine, according to the capability information, location information, and subscription information of UE and/or the information about a serving base station to which UE belongs, the RB of the benefited UE that performs the synthetic communication and the corresponding support UE.

The determining, by an MME according to received synthetic communication UE information, an RB of a benefited UE that performs synthetic communication and a corresponding support UE includes: receiving, by the MME, the synthetic communication UE information sent by a packet data network gateway P-GW, where the synthetic communication UE information includes the RB of the benefited UE that performs the synthetic communication, or the synthetic communication UE information includes information about the RB of the benefited UE that performs the synthetic communication and about the corresponding support UE, where: if the synthetic communication UE information includes information about the RB of the benefited UE that performs the synthetic communication, the MME determines, according to the user information that is of the UE and stored in the MME itself, the support UE that is corresponding to the RB of the benefited UE that performs the synthetic communication; and if the synthetic communication UE information includes the information about the RB of the benefited UE that performs the synthetic communication and about the corresponding support UE, the MME directly determines, according to the synthetic communication UE information, the RB of the benefited UE that performs the synthetic communication and the corresponding support UE, where the user information includes at least one piece of the following information: capability information, location information, and subscription information of the UE, and information about a serving base station to which the UE belongs. Optionally, the P-GW on a network may also determine, according to the NAS message that carries the synthetic communication request or the pairing identifier and is sent by the UE, the RB of the benefited UE that performs the synthetic communication, or the information about the RB of the benefited UE that performs the synthetic communication and about the corresponding support UE, and sends the synthetic communication UE information to the MME. If the synthetic communication UE information includes the RB of the benefited UE that performs the synthetic communication, the MME determines, according to the user information of the UE, the support UE that is corresponding to the RB of the benefited UE that performs the synthetic communication; and if the synthetic communication UE information includes the information about the RB of the benefited UE that performs the synthetic communication and about the corresponding support UE, the MME directly determines, according to the synthetic communication UE information, the RB of the benefited UE that performs the synthetic communication and the corresponding support UE.

302. The MME sends synthetic communication indication information to a base station.

After determining the RB of the benefited UE that needs to perform the synthetic communication and the corresponding support UE, the MME sends the synthetic communication indication information to the base station, where the synthetic communication indication information includes the information about the RB of the benefited UE that performs the synthetic communication and about the corresponding support UE.

303. The base station separately sends corresponding synthetic RB configuration information to the benefited UE and the support UE according to the synthetic communication indication information, so that the benefited UE and the support UE establish a corresponding synthetic RB, thereby enabling the benefited UE and the support UE to form a synthetic communication group to perform the synthetic communication.

After determining the RB of the benefited UE that needs to perform the synthetic communication and the corresponding support UE, the MME sends the synthetic communication indication information to the base station, where the synthetic communication indication information includes the information about the RB of the benefited UE that performs the synthetic communication and about the corresponding support UE. After receiving the synthetic communication indication information, the base station separately sends the corresponding synthetic RB configuration information to the benefited UE and the support UE according to the synthetic communication indication information. After receiving the corresponding synthetic RB configuration information, the support UE directly establishes the corresponding synthetic RB. After the benefited UE receives the corresponding synthetic RB configuration information, if the base station has established a conventional RB for the benefited UE that performs a related service, the benefited UE needs to update conventional RB configuration information to the corresponding synthetic RB configuration information and update the conventional RB to the synthetic RB; and if the base station has not established the conventional RB for the benefited UE, the benefited UE saves the synthetic RB configuration information and establishes the corresponding synthetic RB.

Certainly, if the MME has determined that the benefited UE needs to perform the synthetic communication before determining the RB of the benefited UE that performs the synthetic communication and the corresponding support UE, the MME may give an indication, to the base station, that the RB may be a synthetic RB when sending an RB establishment indication to the base station, the base station may send the synthetic RB configuration information to the benefited UE, and the benefited UE may establish the synthetic RB according to the synthetic RB configuration information. Therefore, when receiving the synthetic communication indication information, the base station sends the corresponding synthetic RB configuration information only to the support UE, so that the support UE establishes the corresponding synthetic RB.

After both the benefited UE and the support UE establish the corresponding synthetic RB, the benefited UE and the support UE form the synthetic communication group, and the synthetic communication may be performed. In the synthetic communication group, a support UE that has a strong signal may receive, by using the corresponding synthetic RB, a part or all of data sent from a network side to the benefited UE, and then forward the data to the benefited UE by using a short-distance communication protocol between UEs. After receiving the forwarded data, the benefited UE synthesizes, by using a synthetic layer in the corresponding synthetic RB, the data forwarded by the support UE with data received by the benefited UE itself, so that a throughput rate and reliability can be increased.

Figure 4:
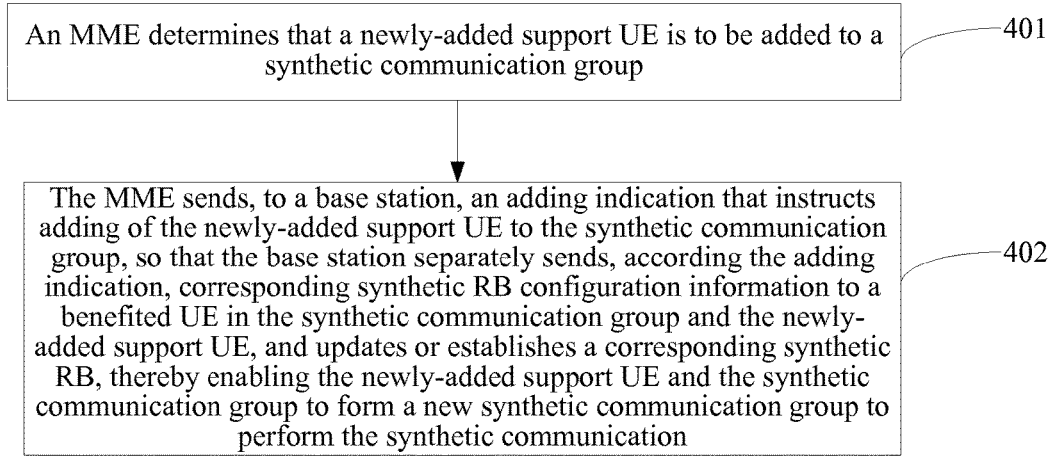
FIG. 4 is a schematic flowchart of a method, according to another embodiment of the present invention, for adding a newly-added support UE to a synthetic communication group.

Optionally, in a case in which the benefited UE and the support UE form the synthetic communication group, a newly-added support UE may also be added to the synthetic communication group. As shown in FIG. 4, a method for adding a support UE to the synthetic communication group includes the following steps:

401. An MME determines that a newly-added support UE is to be added to a synthetic communication group.

There are two methods for determining, by the MME, that the newly-added support UE is to be added to the synthetic communication group.

Method 1: The MME receives an adding message sent by the newly-added support UE, where the adding message carries a synthetic communication request and a pairing identifier; and the MME determines, according to the pairing identifier, that the newly-added support UE is to be added to a corresponding synthetic communication group.

When the newly-added support UE is close to a benefited UE, the newly-added support UE actively negotiates with the benefited UE for performing synthetic communication, serves as a support for the benefited UE, obtains a synthetic communication request and/or a pairing identifier of a synthetic communication group in which the benefited UE is located, and then sends the adding message to the MME, where the adding message carries the synthetic communication request and the pairing identifier; and the MME determines, according to the synthetic communication request and the pairing identifier, that the newly-added support UE is to be added to the corresponding synthetic communication group to perform the synthetic communication. The pairing identifier of the newly-added support UE is the same as that of the benefited UE and the support UE in the synthetic communication group.

Method 2: The MME determines, according to user information that is of the newly-added support UE and stored in the MME itself, that the newly-added support UE is to be added to the corresponding synthetic communication group, where the user information includes at least one piece of the following information: capability information, location information, and subscription information of the UE, and information about a serving base station to which the UE belongs.

When the newly-added support UE is close to the benefited UE in the synthetic communication group and the newly-added support UE has relatively strong signal strength, the MME may determine, according to the user information of the newly-added support UE such as the capability information, the location information, the subscription information and/or the information about a serving base station to which the UE belongs, that the newly-added support UE is to be added to the synthetic communication group in which the benefited UE is located.

402. The MME sends, to a base station, an adding indication that instructs adding of the newly-added support UE to the synthetic communication group, so that the base station separately sends, according to the adding indication, corresponding synthetic RB configuration information to a benefited UE in the synthetic communication group and the newly-added support UE, and updates or establishes a corresponding synthetic RB, thereby enabling the newly-added support UE and the synthetic communication group to form a new synthetic communication group to perform synthetic communication.

After determining that the newly-added support UE is to be added to the synthetic communication group, the MME sends the adding indication to the base station. After receiving the adding indication, the base station separately sends the corresponding synthetic RB configuration information to the benefited UE in the synthetic communication group and the newly-added support UE according to the adding indication, and updates the synthetic RB configuration information of the benefited UE in the synthetic communication group, or establishes the corresponding synthetic RB for the newly-added support UE, so that the newly-added support UE and the synthetic communication group form the new synthetic communication group to perform the synthetic communication. Certainly, when it is required, the base station may also send the corresponding synthetic RB configuration information to the support UE in the synthetic communication group and update the synthetic RB configuration information of the support UE in the synthetic communication group.

Figure 5:
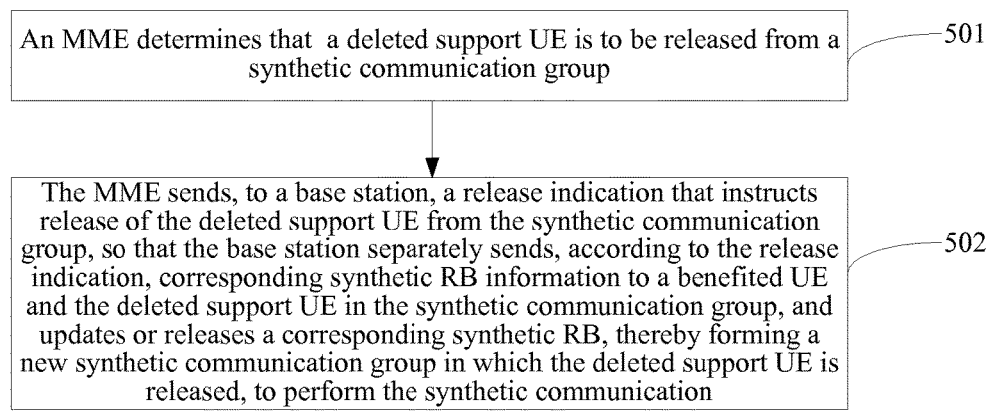
FIG. 5 is a schematic flowchart of a method, according to another embodiment of the present invention, for releasing a support UE from a synthetic communication group.

Optionally, in a case in which the benefited UE and the support UE form the synthetic communication group, a deleted support UE may also be released from the synthetic communication group. As shown in FIG. 5, a method for releasing a support UE from the synthetic communication group includes the following steps:

501. An MME determines that a deleted support UE is to be released from a synthetic communication group.

Optionally, there are two methods for determining, by the MME, that the deleted support UE is to be released from the synthetic communication group.

Method 1: The MME receives a release message sent by the deleted support UE, where the release message carries a synthetic bearer release request and a pairing identifier; and the MME releases the deleted support UE from the synthetic communication group according to the synthetic bearer release request and the pairing identifier.

When the deleted support UE disables a synthetic communication function and no longer serves the benefited UE, the deleted support UE actively sends the release message to the MME, where the release message carries the synthetic bearer release request and the pairing identifier; and the MME determines, according to the synthetic bearer release request and the pairing identifier, that the deleted support UE is to be released from the corresponding synthetic communication group.

Method 2: The MME determines, according to user information that is of the deleted support UE and stored in the MME itself, that the deleted support UE is to be released from the synthetic communication group, where the user information includes at least one piece of the following information: capability information, location information, and subscription information of the UE, and information about a serving base station to which the UE belongs.

When the deleted support UE is away from the benefited UE in the synthetic communication group or signal strength of the deleted support UE becomes weak, the MME may determine, according to the user information of the deleted support UE, that the deleted support UE is to be released from the synthetic communication group.

502. The MME sends, to a base station, a release indication that instructs release of the deleted support UE from the synthetic communication group, so that the base station separately sends, according to the release indication, corresponding synthetic RB information to a benefited UE and the deleted support UE in the synthetic communication group, and updates or releases a corresponding synthetic RB, thereby forming a new synthetic communication group in which the deleted support UE is released, to perform the synthetic communication.

After determining that the deleted support UE is to be released from the synthetic communication group, the MME sends the release indication to the base station. After receiving the release indication, the base station separately sends, according to the release indication, the corresponding synthetic RB information to the benefited UE, the support UE, and the deleted support UE in the synthetic communication group, releases the corresponding synthetic RB of the deleted support UE, and updates synthetic RB configuration information of the benefited UE and another support UE in the synthetic communication group, thereby enabling the synthetic communication group, in which the deleted support UE is released, to form the new synthetic communication group to perform the synthetic communication. Certainly, when it is required, the base station may also send the corresponding synthetic RB configuration information to the another support UE in the synthetic communication group and update the synthetic RB configuration information of the another support UE in the synthetic communication group.

Figure 6:
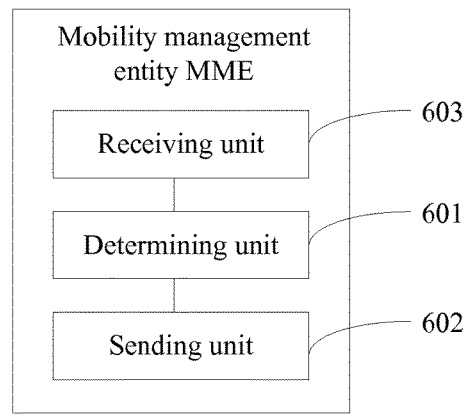
FIG. 6 is a structural block diagram of an MME according to another embodiment of the present invention.

An embodiment of the present invention further provides an MME. As shown in FIG. 6, the MME includes a determining unit 601, a sending unit 602, and a receiving unit 603.

The determining unit 601 is configured to determine, according to a pairing identifier of a UE or user information of a UE or received synthetic communication UE information, an RB of a benefited UE that performs synthetic communication and a corresponding support UE.

During a process of normal communication over a conventional network, if a UE needs to perform such a service as uploading data after entering an access network, the UE sends, to the MME, an NAS message that requests bearer establishment. After receiving the NAS message, the MME instructs a base station to establish an RB for the UE, to perform a related service. If a location environment in which the UE is situated is poor and a signal is weak, the UE may perform multiuser synthetic communication as a benefited UE, and a support UE that has a strong signal and is adjacent to the benefited UE forwards information about the related service on a network to the benefited UE to perform the related service. If it the synthetic communication needs to be performed, the base station needs to separately establish a corresponding synthetic RB for the benefited UE and the support UE.

Herein, the determining unit 601 of the MME needs to first determine the RB of the benefited UE that needs to perform the synthetic communication and the corresponding support UE. The determining unit 601 may determine, according to the pairing identifier of a UE or the user information of a UE or the received synthetic communication UE information, the RB of the benefited UE that performs the synthetic communication and the corresponding support UE.

When the determining unit 601 determines, according to the pairing identifier of a UE, the radio bearer RB of the benefited user equipment UE that performs the synthetic communication and the corresponding support UE, the receiving unit 603 is configured to receive a non-access stratum NAS message sent by the UE, where the NAS message carries the pairing identifier of the UE. The determining unit 601 is configured to determine that UEs, which are corresponding to a same pairing identifier in the pairing identifier received by the receiving unit 603, are the benefited UE that performs the synthetic communication and the corresponding support UE, to further determine the RB of the benefited UE that performs the synthetic communication and the corresponding support UE. The NAS message that is sent by the UEs and received by the receiving unit 603 is an attach request message or a service request message; or the NAS message that is sent by the UEs and received by the receiving unit 603 is a TAU message, or a newly-added NAS message indicating that no bearer needs to be established.

When the determining unit 601 determines, according to the user information of a UE, the RB of the benefited UE that performs the synthetic communication and the corresponding support UE, the receiving unit 603 is configured to receive an NAS message that carries a synthetic communication request and is sent by at least two UEs. The determining unit 601 is configured to determine, according to user information of the at least two UEs, the RB of the benefited UE that performs the synthetic communication and the corresponding support UE; or the determining unit 601 is configured to determine, according to user information that is of all UEs and stored in the determining unit 601 itself, the RB of the benefited UE that performs the synthetic communication and the corresponding support UE, where the user information of UE includes at least one piece of the following information: capability information, location information, and subscription information of UE, and information about a serving base station to which UE belongs.

The NAS message that is sent by the UEs and received by the receiving unit 603 is an attach request message or a service request message; or the NAS message that is sent by the UEs and received by the receiving unit 603 is a TAU message, or a newly-added NAS message indicating that no bearer needs to be established.

When the determining unit 601 determines, according to the received synthetic communication UE information, the RB of the benefited UE that performs the synthetic communication and the corresponding support UE, the receiving unit 603 is configured to receive the synthetic communication UE information sent by a P-GW, where the synthetic communication UE information includes the RB of the benefited UE that performs the synthetic communication, or the synthetic communication UE information includes information about the RB of the benefited UE that performs the synthetic communication and about the corresponding support UE, where: if the synthetic communication UE information includes the RB of the benefited UE that performs the synthetic communication, the determining unit 601 is configured to determine, according to the user information that is of a UE and stored in the determining unit 601 itself, the support UE that is corresponding to the RB of the benefited UE that performs the synthetic communication, where the RB of the benefited UE is included in the synthetic communication UE information received by the receiving unit 603; and if the synthetic communication UE information includes the information about the RB of the benefited UE that performs the synthetic communication and about the corresponding support UE, the MME directly determines, according to the synthetic communication UE information received by the receiving unit 603, the RB of the benefited UE that performs the synthetic communication and the corresponding support UE, where the user information includes at least one piece of the following information: capability information, location information, and subscription information of the UE, and information about a serving base station to which the UE belongs.

The sending unit 602 is configured to send synthetic communication indication information to the base station, where the synthetic communication indication information includes information about the RB of the benefited UE that performs the synthetic communication and about the corresponding support UE, and the RB of the benefited UE that performs the synthetic communication and the corresponding support UE are determined by the determining unit 601, so that the base station separately sends corresponding synthetic RB configuration information to the benefited UE and the support UE according to the synthetic communication indication information, and updates or establishes a corresponding synthetic RB, thereby enabling the benefited UE and the support UE to form a synthetic communication group to perform the synthetic communication.

After the determining unit 601 determines the RB of the benefited UE that needs to perform the synthetic communication and the corresponding support UE, the sending unit 602 sends the synthetic communication indication information to the base station, where the synthetic communication indication information includes the information about the RB of the benefited UE that performs the synthetic communication and about the corresponding support UE. After receiving the synthetic communication indication information, the base station separately sends the corresponding synthetic RB configuration information to the benefited UE and the support UE according to the synthetic communication indication information. After receiving the corresponding synthetic RB configuration information, the support UE directly establishes the corresponding synthetic RB. After the benefited UE receives the corresponding synthetic RB configuration information, if the base station has established a conventional RB for the benefited UE that performs a related service, the benefited UE needs to update conventional RB configuration information to the corresponding synthetic RB configuration information and update the conventional RB to the synthetic RB; and if the base station has not established the conventional RB for the benefited UE, the benefited UE saves the synthetic RB configuration information and establishes the corresponding synthetic RB.

Certainly, if the MME has determined that the benefited UE needs to perform the synthetic communication before determining the RB of the benefited UE that performs the synthetic communication and the corresponding support UE, the MME may give an indication, to the base station, that the RB may be a synthetic RB when sending an RB establishment indication to the base station, the base station may send the synthetic RB configuration information to the benefited UE, and the benefited UE may establish the synthetic RB according to the synthetic RB configuration information. Therefore, when receiving the synthetic communication indication information, the base station sends the corresponding synthetic RB configuration information only to the support UE, so that the support UE establishes the corresponding synthetic RB.

After both the benefited UE and the support UE establish the corresponding synthetic RB, the benefited UE and the support UE form the synthetic communication group, and the synthetic communication may be performed. In the synthetic communication group, a support UE that has a strong signal may receive, by using the corresponding synthetic RB, a part or all of data sent from a network side to the benefited UE, and then forward the data to the benefited UE by using a short-distance communication protocol between UEs. After receiving the forwarded data, the benefited UE synthesizes, by using a synthetic layer in the corresponding synthetic RB, the data forwarded by the support UE with data received by the benefited UE itself, so that a throughput rate and reliability can be increased.

Optionally, in a case in which the benefited UE and the support UE form the synthetic communication group, a newly-added support UE may also be added to the synthetic communication group.

When the newly-added support UE is added to the synthetic communication group, the receiving unit 603 is further configured to receive an adding message sent by the newly-added support UE, where the adding message carries the synthetic communication request and the pairing identifier, and the MME determines, according to the pairing identifier, that the newly-added support UE is to be added to a corresponding synthetic communication group; the determining unit 601 is further configured to determine, according to the pairing identifier received by the receiving unit 603, that the newly-added support UE is to be added to the corresponding synthetic communication group; and the sending unit 602 is configured to send, to the base station, an adding indication that instructs adding of the newly-added support UE to the synthetic communication group, where the adding is determined by the determining unit 601, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form a new synthetic communication group to perform the synthetic communication.

Optionally, when the newly-added support UE is added to the synthetic communication group, the determining unit 601 is further configured to determine, according to user information that is of the newly-added support UE and stored in the determining unit 601 itself, that the newly-added support UE is to be added to the corresponding synthetic communication group, where the user information includes at least one piece of the following information: capability information, location information, and subscription information of the UE, and information about a serving base station to which the UE belongs; and the sending unit 602 is configured to send, to the base station, the adding indication that instructs adding of the newly-added support UE to the synthetic communication group, where the adding is determined by the determining unit 601, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form a new synthetic communication group to perform the synthetic communication.

Optionally, in a case in which the benefited UE and the support UE form the synthetic communication group, a deleted support UE may also be released from the synthetic communication group.

When the deleted support UE is released from the synthetic communication group, the receiving unit 603 is further configured to receive a release message sent by the deleted support UE, where the release message carries a synthetic bearer release request and the pairing identifier; the determining unit 601 is further configured to determine the deleted support UE in the synthetic communication group according to the synthetic bearer release request and the pairing identifier that are received by the receiving unit 603; and the sending unit 602 is further configured to send, to the base station, a release indication that instructs release of the deleted support UE from the synthetic communication group, where the release is determined by the determining unit 601, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

Optionally, when the deleted support UE is released from the synthetic communication group, the determining unit 601 is configured to determine, according to user information that is of the deleted support UE and stored in the determining unit 601 itself, that the deleted support UE is to be released from the synthetic communication group, where the user information includes at least one piece of the following information: capability information, location information, and subscription information of the UE, and information about a serving base station to which the UE belongs; and the sending unit 602 is configured to send, to the base station, the release indication that instructs release of the deleted support UE from the synthetic communication group, where the release is determined by the determining unit 601, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

Figure 7:
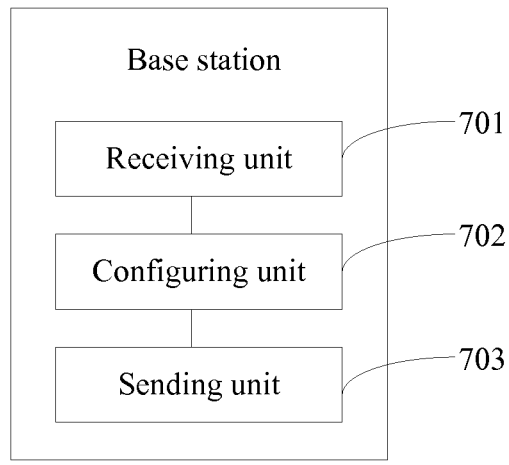
FIG. 7 is a structural block diagram of a base station according to another embodiment of the present invention.

An embodiment of the present invention further provides a base station. As shown in FIG. 7, the base station includes: a receiving unit 701, a configuring unit 702, and a sending unit 703.

The receiving unit 701 is configured to receive synthetic communication indication information sent by an MME, where the synthetic communication indication information includes information about an RB of a benefited UE that performs synthetic communication and about a corresponding support UE.

The configuring unit 702 is configured to separately configure corresponding synthetic RB configuration information for the benefited UE and the support UE according to the synthetic communication indication information received by the receiving unit 701.

The sending unit 703 is further configured to separately send the corresponding synthetic RB configuration information, which is configured by the configuring unit 702, to the benefited UE and the support UE, and establish a corresponding synthetic RB, thereby enabling the benefited UE and the support UE to form a synthetic communication group to perform the synthetic communication.

The sending unit 703 of the base station separately sends the corresponding synthetic RB configuration information from the configuring unit 702 to the benefited UE and the support UE. After receiving the corresponding synthetic RB configuration information, the support UE directly establishes the corresponding synthetic RB according to the corresponding RB configuration information. After the benefited UE receives the corresponding synthetic RB configuration information, if the base station has established a conventional RB for the benefited UE that performs a related service, the conventional RB needs to be updated to the corresponding synthetic RB; and if the base station has not established the conventional RB for the benefited UE, the corresponding synthetic RB is directly established. In this way, the benefited UE and the support UE establish the corresponding synthetic RB to form the synthetic communication group, and the synthetic communication may be performed. In the synthetic communication group, a support UE that has a strong signal may receive, by using the corresponding synthetic RB, a part or all of data sent from a network side to the benefited UE, and then forward the data to the benefited UE by using a short-distance communication protocol between UEs. After receiving the forwarded data, the benefited UE synthesizes, by using a synthetic layer in the corresponding synthetic RB, the data forwarded by the support UE with data received by the benefited UE itself, so that a throughput rate and reliability can be increased.

Optionally, in a case in which the benefited UE and the support UE form the synthetic communication group, a newly-added support UE may also be added to the synthetic communication group. In this case, the receiving unit 701 is further configured to receive an adding indication that is sent by the MME and instructs adding of a newly-added support UE to the synthetic communication group; the configuring unit 702 is further configured to separately configure, according to the adding indication received by the receiving unit 701, the corresponding synthetic RB configuration information for the benefited UE and the support UE in the synthetic communication group and the newly-added support UE; and the sending unit 703 is further configured to separately send the corresponding synthetic RB configuration information, which is configured by the configuring unit 702, to the benefited UE and the support UE in the synthetic communication group and the newly-added support UE, and update or establish the corresponding synthetic RB, thereby enabling the newly-added support UE and the synthetic communication group to form a new synthetic communication group to perform the synthetic communication.

Optionally, in a case in which the benefited UE and the support UE form the synthetic communication group, a deleted support UE may also be released from the synthetic communication group. In this case, the receiving unit 701 is further configured to receive a release indication that is sent by the MME and instructs release of a deleted support UE from the synthetic communication group; the configuring unit 702 is further configured to separately configure, according to the release indication received by the receiving unit 701, the corresponding synthetic RB configuration information for the benefited UE and the deleted support UE in the synthetic communication group; and the sending unit 703 is further configured to separately send the corresponding synthetic RB configuration information, which is configured by the configuring unit 702, to the benefited UE and the deleted support UE in the synthetic communication group, and update or release the corresponding synthetic RB, thereby forming a new synthetic communication group to perform the synthetic communication.

Figure 8:
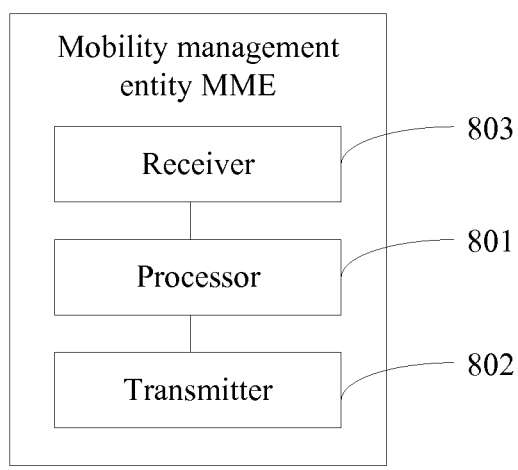
FIG. 8 is a structural block diagram of another MME according to another embodiment of the present invention.

An embodiment of the present invention further provides an MME. As shown in FIG. 8, the MME includes: a processor 801, a transmitter 802, and a receiver 803.

The processor 801 is configured to determine, according to a pairing identifier of a UE or user information of a UE or received synthetic communication UE information, an RB of a benefited UE that performs synthetic communication and a corresponding support UE.

During a process of normal communication over a conventional network, if a UE needs to perform such a service as uploading data after entering an access network, the UE sends, to the MME, an NAS message that requests bearer establishment. After receiving the NAS message, the MME instructs a base station to establish an RB for the UE, to perform a related service. If a location environment in which the UE is situated is poor and a signal is weak, the UE may perform multiuser synthetic communication as a benefited UE, and a support UE that has a strong signal and is adjacent to the benefited UE forwards information about the related service on a network to the benefited UE to perform the related service. If the synthetic communication needs to be performed, the base station needs to separately establish a corresponding synthetic RB for the benefited UE and the support UE.

Herein, the processor 801 of the MME needs to first determine the RB of the benefited UE that needs to perform the synthetic communication and the corresponding support UE. The processor 801 may determine, according to the pairing identifier of the UE or the user information of the UE or the received synthetic communication UE information, the RB of the benefited UE that performs the synthetic communication and the corresponding support UE.

When the processor 801 determines, according to the pairing identifier of a UE, the radio bearer RB of the benefited user equipment UE that performs the synthetic communication and the corresponding support UE, the receiver 803 is configured to receive a non-access stratum NAS message sent by the UE, where the NAS message carries the pairing identifier of the UE. The processor 801 is configured to determine that UEs, which are corresponding to a same pairing identifier in the pairing identifier received by the receiver 803, are the benefited UE that performs the synthetic communication and the corresponding support UE, to further determine the RB of the benefited UE that performs the synthetic communication and the corresponding support UE. The NAS message that is sent by the UEs and received by the receiver 803 is an attach request message or a service request message; or the NAS message that is sent by the UEs and received by the receiver 803 is a TAU message, or a newly-added NAS message indicating that no bearer needs to be established.

When the processor 801 determines, according to the user information of a UE, the RB of the benefited UE that performs the synthetic communication and the corresponding support UE, the receiver 803 is configured to receive an NAS message that carries a synthetic communication request and is sent by at least two UEs. The processor 801 is configured to determine, according to user information of the at least two UEs, the RB of the benefited UE that performs the synthetic communication and the corresponding support UE, or the processor 801 is configured to determine, according to user information that is of all UEs and stored in the processor 801 itself, the RB of the benefited UE that performs the synthetic communication and the corresponding support UE, where the user information of UE includes at least one piece of the following information: capability information, location information, and subscription information of UE, and information about a serving base station to which UE belongs. The NAS message that is sent by the UEs and received by the receiver 803 is an attach request message or a service request message; or the NAS message that is sent by the UEs and received by the receiver 803 is a TAU message, or a newly-added NAS message indicating that no bearer needs to be established.

When the processor 801 determines, according to the received synthetic communication UE information, the RB of the benefited UE that performs the synthetic communication and the corresponding support UE, the receiver 803 is configured to receive the synthetic communication UE information sent by a P-GW, where the synthetic communication UE information includes the RB of the benefited UE that performs the synthetic communication, or the synthetic communication UE information includes information about the RB of the benefited UE that performs the synthetic communication and about the corresponding support UE, where: if the synthetic communication UE information includes the RB of the benefited UE that performs the synthetic communication, the processor 801 is configured to determine, according to the user information that is of a UE and stored in the processor 801 itself, the support UE that is corresponding to the RB of the benefited UE that performs the synthetic communication, where the RB of the benefited UE is included in the synthetic communication UE information received by the receiver 803; and if the synthetic communication UE information includes the information about the RB of the benefited UE that performs the synthetic communication and about the corresponding support UE, the MME directly determines, according to the synthetic communication UE information received by the receiver 803, the RB of the benefited UE that performs the synthetic communication and the corresponding support UE, where the user information includes at least one piece of the following information: capability information, location information, and subscription information of the UE, and information about a serving base station to which the UE belongs.

The transmitter 802 is configured to send synthetic communication indication information to the base station, where the synthetic communication indication information includes information about the RB of the benefited UE that performs the synthetic communication and about the corresponding support UE, and the RB of the benefited UE that performs the synthetic communication and the corresponding support UE are determined by the processor 801, so that the base station separately sends corresponding synthetic RB configuration information to the benefited UE and the support UE according to the synthetic communication indication information, and updates or establishes a corresponding synthetic RB, thereby enabling the benefited UE and the support UE to form a synthetic communication group to perform the synthetic communication.

After the processor 801 determines the RB of the benefited UE that needs to perform the synthetic communication and the corresponding support UE, the transmitter 802 sends the synthetic communication indication information to the base station, where the synthetic communication indication information includes the information about the RB of the benefited UE that performs the synthetic communication and about the corresponding support UE. After receiving the synthetic communication indication information, the base station separately sends the corresponding synthetic RB configuration information to the benefited UE and the support UE according to the synthetic communication indication information. After receiving the corresponding synthetic RB configuration information, the support UE directly establishes the corresponding synthetic RB. After the benefited UE receives the corresponding synthetic RB configuration information, if the base station has established a conventional RB for the benefited UE that performs a related service, the benefited UE needs to update conventional RB configuration information to the corresponding synthetic RB configuration information and update the conventional RB to the synthetic RB; and if the base station has not established the conventional RB for the benefited UE, the benefited UE saves the synthetic RB configuration information and establishes the corresponding synthetic RB.

Certainly, if the MME has determined that the benefited UE needs to perform the synthetic communication before determining the RB of the benefited UE that performs the synthetic communication and the corresponding support UE, the MME may give an indication, to the base station, that the RB may be a synthetic RB when sending an RB establishment indication to the base station, the base station may send the synthetic RB configuration information to the benefited UE, and the benefited UE may establish the synthetic RB according to the synthetic RB configuration information. Therefore, when receiving the synthetic communication indication information, the base station sends the corresponding synthetic RB configuration information only to the support UE, so that the support UE establishes the corresponding synthetic RB.

After both the benefited UE and the support UE establish the corresponding synthetic RB, the benefited UE and the support UE form the synthetic communication group, and the synthetic communication may be performed. In the synthetic communication group, a support UE that has a strong signal may receive, by using the corresponding synthetic RB, a part or all of data sent from a network side to the benefited UE, and then forward the data to the benefited UE by using a short-distance communication protocol between UEs. After receiving the forwarded data, the benefited UE synthesizes, by using a synthetic layer in the corresponding synthetic RB, the data forwarded by the support UE with data received by the benefited UE itself, so that a throughput rate and reliability can be increased.

Optionally, in a case in which the benefited UE and the support UE form the synthetic communication group, a newly-added support UE may also be added to the synthetic communication group.

When the newly-added support UE is added to the synthetic communication group, the receiver 803 is further configured to receive an adding message sent by the newly-added support UE, where the adding message carries the synthetic communication request and the pairing identifier, and the MME determines, according to the pairing identifier, that the newly-added support UE is to be added to a corresponding synthetic communication group; the processor 801 is further configured to determine, according to the pairing identifier received by the receiver 803, that the newly-added support UE is to be added to the corresponding synthetic communication group; and the transmitter 802 is configured to send, to the base station, an adding indication that instructs adding of the newly-added support UE to the synthetic communication group, where the adding is determined by the processor 801, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form a new synthetic communication group to perform the synthetic communication.

Optionally, when the newly-added support UE is added to the synthetic communication group, the processor 801 is further configured to determine, according to user information that is of the newly-added support UE and stored in the processor 801 itself, that the newly-added support UE is to be added to the corresponding synthetic communication group, where the user information includes at least one piece of the following information: capability information, location information, and subscription information of the UE, and information about a serving base station to which the UE belongs; and the transmitter 802 is configured to send, to the base station, the adding indication that instructs adding of the newly-added support UE to the synthetic communication group, where the adding is determined by the processor 801, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form a new synthetic communication group to perform the synthetic communication.

Optionally, in a case in which the benefited UE and the support UE form the synthetic communication group, a deleted support UE may also be released from the synthetic communication group.

When the deleted support UE is released from the synthetic communication group, the receiver 803 is further configured to receive a release message sent by the deleted support UE, where the release message carries a synthetic bearer release request and the pairing identifier; the processor 801 is further configured to determine the deleted support UE in the synthetic communication group according to the synthetic bearer release request and the pairing identifier that are received by the receiver 803; and the transmitter 802 is further configured to send, to the base station, a release indication that instructs release of the deleted support UE from the synthetic communication group, where the release is determined by the processor 801, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

Optionally, when the deleted support UE is released from the synthetic communication group, the processor 801 is configured to determine, according to user information that is of the deleted support UE and stored in the processor 801 itself, that the deleted support UE is to be released from the synthetic communication group, where the user information includes at least one piece of the following information: capability information, location information, and subscription information of the UE, and information about a serving base station to which the UE belongs; and the transmitter 802 is configured to send, to the base station, the release indication that instructs release of the deleted support UE from the synthetic communication group, where the release is determined by the processor 801, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

Figure 9:
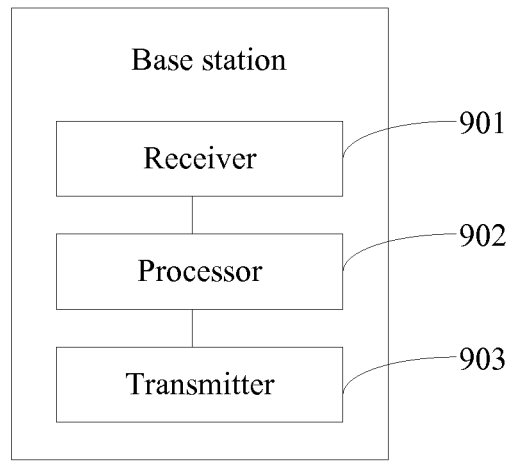
FIG. 9 is a structural block diagram of another MME according to another embodiment of the present invention.

An embodiment of the present invention further provides a base station. As shown in FIG. 9, the base station includes: a receiver 901, a processor 902, and a transmitter 903.

The receiver 901 is configured to receive synthetic communication indication information sent by an MME, where the synthetic communication indication information includes information about an RB of a benefited UE that performs synthetic communication and about a corresponding support UE.

The processor 902 is configured to separately configure corresponding synthetic RB configuration information for the benefited UE and the support UE according to the synthetic communication indication information received by the receiver 901.

The transmitter 903 is further configured to separately send the corresponding synthetic RB configuration information, which is configured by the processor 902, to the benefited UE and the support UE, and establish a corresponding synthetic RB, thereby enabling the benefited UE and the support UE to form a synthetic communication group to perform the synthetic communication.

The transmitter 903 of the base station separately sends the corresponding synthetic RB configuration information of the processor 902 to the benefited UE and the support UE. After receiving the corresponding synthetic RB configuration information, the support UE directly establishes the corresponding synthetic RB according to the corresponding RB configuration information. After the benefited UE receives the corresponding synthetic RB configuration information, if the base station has established a conventional RB for the benefited UE that performs a related service, the conventional RB needs to be updated to the corresponding synthetic RB; and if the base station has not established the conventional RB for the benefited UE, the corresponding synthetic RB is directly established. In this way, the benefited UE and the support UE establish the corresponding synthetic RB to form the synthetic communication group, and the synthetic communication may be performed. In the synthetic communication group, a support UE that has a strong signal may receive, by using the corresponding synthetic RB, a part or all of data sent from a network side to the benefited UE, and then forward the data to the benefited UE by using a short-distance communication protocol between UEs. After receiving the forwarded data, the benefited UE synthesizes, by using a synthetic layer in the corresponding synthetic RB, the data forwarded by the support UE with data received by the benefited UE itself, so that a throughput rate and reliability can be increased.

Optionally, in a case in which the benefited UE and the support UE form the synthetic communication group, a newly-added support UE may also be added to the synthetic communication group. In this case, the receiver 901 is further configured to receive an adding indication that is sent by the MME and instructs adding of the newly-added support UE to the synthetic communication group; the processor 902 is further configured to separately configure, according to the adding indication received by the receiver 901, the corresponding synthetic RB configuration information for the benefited UE and the support UE in the synthetic communication group and the newly-added support UE; and the transmitter 903 is further configured to separately send the corresponding synthetic RB configuration information, which is configured by the processor 902, to the benefited UE and the support UE in the synthetic communication group and the newly-added support UE, and update or establish the corresponding synthetic RB, thereby enabling the newly-added support UE and the synthetic communication group to form a new synthetic communication group to perform the synthetic communication.

Optionally, in a case in which the benefited UE and the support UE form the synthetic communication group, a deleted support UE may also be released from the synthetic communication group. In this case, the receiver 901 is further configured to receive a release indication that is sent by the MME and instructs release of the deleted support UE from the synthetic communication group; the processor 902 is further configured to separately configure, according to the release indication received by the receiver 901, the corresponding synthetic RB configuration information for the benefited UE and the deleted support UE in the synthetic communication group; and the transmitter 903 is further configured to separately send the corresponding synthetic RB configuration information, which is configured by the processor 902, to the benefited UE and the deleted support UE in the synthetic communication group, and update or release the corresponding synthetic RB, thereby forming a new synthetic communication group to perform the synthetic communication.

Figure 10:
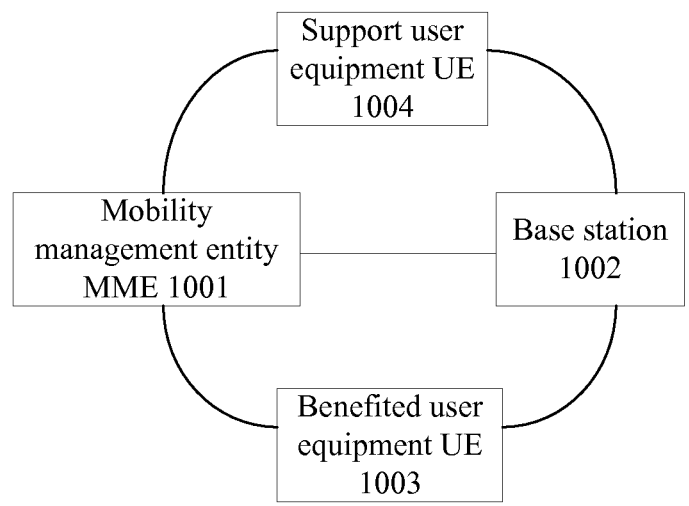
FIG. 10 is a structural block diagram of an RB establishment system according to another embodiment of the present invention.

An embodiment of the present invention further provides an RB establishment system. As shown in FIG. 10, the system includes an MME 1001, a base station 1002, and at least two UEs, where the at least two UEs includes a benefited UE 1003 and a support UE 1004.

The MME 1001 is configured to determine, according to a pairing identifier of a UE or user information of a UE or received synthetic communication UE information, an RB of a benefited UE that performs synthetic communication and a corresponding support UE, and send synthetic communication indication information to the base station 1002, where the synthetic communication indication information includes information about the RB of the benefited UE 1003 that performs the synthetic communication and about the corresponding support UE 1004; the base station 1002 is configured to separately send corresponding synthetic RB configuration information to the benefited UE 1003 and the support UE 1004 according to the synthetic communication indication information; and the benefited UE 1003 and the support UE 1004 are configured to receive the corresponding synthetic RB configuration information sent by the base station 1002, and establish a corresponding synthetic RB according to the corresponding synthetic RB configuration information, thereby enabling the benefited UE and the support UE to form a synthetic communication group to perform the synthetic communication.

Optionally, the MME 1001 may also determine a newly-added support UE that is to be added to the synthetic communication group, and send, to the base station 1002, an adding indication that instructs adding of the newly-added support UE to the synthetic communication group; and the base station 1002 receives the adding indication, separately sends, according to the adding indication, the corresponding synthetic RB configuration information to the benefited UE 1003 in the synthetic communication group and the newly-added support UE, and updates or establishes the corresponding synthetic RB, thereby enabling the newly-added support UE and the synthetic communication group to form a new synthetic communication group to perform the synthetic communication.

The MME 1001 may also determine that a deleted support UE is to be released from the synthetic communication group, and send, to the base station 1002, a release indication that instructs release of the deleted support UE from the synthetic communication group; and the base station 1002 separately sends, according to the release indication, the corresponding synthetic RB configuration information to the benefited UE and the deleted support UE in the synthetic communication group, and updates or releases the corresponding synthetic RB, thereby forming a new synthetic communication group in which the deleted support UE is released, to perform the synthetic communication.

According to the radio bearer establishment method, apparatus, and system provided by this embodiment of the present invention, an MME determines, according to a pairing identifier of a UE or user information of a UE or received synthetic communication UE information, an RB of a benefited UE that performs synthetic communication and a corresponding support UE, and instructs a base station to separately send corresponding synthetic RB configuration information to the benefited UE and the support UE, and the benefited UE and the support UE establish a corresponding synthetic RB, thereby enabling the benefited UE and the support UE to form a synthetic communication group. In addition, the MME may also determine that a support UE is to be added to or a support UE is to be deleted from the synthetic communication group, and instruct the base station to add or release a synthetic RB of the support UE, thereby forming a new synthetic communication group, which ensures reliability and a throughput rate of data transmission. In a synthetic communication group, the benefited UE and the support UE establish the corresponding synthetic RB, so that data sent from a network side can be forwarded to the benefited UE by using the synthetic RB of the support UE and a short-distance communication protocol between UEs, to implement multiuser synthetic communication.

The UE in this embodiment of the present invention mostly is a smartphone, and the smartphone basically can support both a short-distance communications technology (such as WiFi or BlueTooth) and a cellular communications technology (such as LTE, 3G UMTS, CDMA, 2G GSM, or WiMax). An example in which the cellular technology is SAE/LTE and the short-distance communications technology is WiFi is used. In a scenario of cooperative communication among multiple users on a single network node, or in a scenario of multiple UEs cooperative communication (multiple UEs cooperative communication, MUCC for short), when at least two UEs have a feature of supporting both WiFi and LTE, an MUCC relationship may be established between the at least two UEs to increase reliability and a throughput rate, that is, one UE in the at least two UEs needs to send or receive data, and another UE other than the UE may support and assist the UE in performing communication. In the present invention, the UE is named as a benefited UE, a served UE or an assisted UE, and the another UE other than the UE is named as a support UE, a serving UE, or an assisting UE. The foregoing naming of the UE is merely an example enumerated in the present invention, and the naming of the UE in the present invention includes but is not limited to the foregoing example of the naming.

A support UE and a benefited UE are used as an example. The benefited UE may be a final sender of uplink data or a final receiver of downlink data (from a cellular perspective). For an RB, generally, there is only one RB, and the support UE is a UE that is used to assist the benefited UE in forwarding the data. For an RB of the benefited UE, there may be multiple RBs.

A support UE and a benefited UE are used as an example, and a concept of the benefited UE and the support UE is seen from a perspective of an RB of the benefited UE. For example, a UE 1 and a UE 2 form MUCC, and the UE 1 and the UE 2 may mutually assist each other in communication. In this way, from a perspective of an RB of the UE 1, the UE 2 may support the RB of the UE 1; in this case, the UE 1 is a benefited UE, and the UE 2 is a support UE. In addition, the UE 1 may also support an RB of the UE 2; in this case, from a perspective of this RB of the UE 2, the UE 2 is a benefited UE, and the UE 1 is a support UE.

A support UE and a benefited UE are used as an example. When the foregoing UE is within a connection range of a same short-distance, a network may separately send the downlink data to the foregoing support UE and the benefited UE (according to an optimized method, a network scheduler generally selects a UE that has a best radio link condition at that time to send the downlink data). When the network sends the downlink data to the support UE, then the support UE that receives the data sends, by using short-distance communication (such as WiFi), the data to the benefited UE. Certainly, the data may also directly reach the benefited UE, and the benefited UE performs data combination. Likewise, uplink data of the benefited UE may also be sent to the network by using the benefited UE itself or another support UE, and then the network performs the data combination and implements the cooperative communication between the UEs.

The reliability and the throughput rate of benefited UE communication can be increased by using the cooperative transmission of the support UE.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A radio bearer RB establishment method, comprising:
   determining, by a mobility management entity MME according to a pairing identifier of a user equipment UE or user information of a UE or received synthetic communication UE information, an RB of a benefited user equipment UE that performs synthetic communication and a corresponding support UE;
   sending, by the MME, synthetic communication indication information to a base station, wherein the synthetic communication indication information comprises information about the RB of the benefited UE that performs the synthetic communication and about the corresponding support UE, so that the base station separately sends corresponding synthetic RB configuration information to the benefited UE and the support UE according to the synthetic communication indication information, and the benefited UE and the support UE establish a corresponding synthetic RB, thereby enabling the benefited UE and the support UE to form a synthetic communication group to perform the synthetic communication;
   receiving, by the MME, a release message sent by a deleted support UE, wherein the release message carries a synthetic bearer release request and the pairing identifier;
   releasing, by the MME, the deleted support UE from the synthetic communication group according to the synthetic bearer release request and the pairing identifier; and
   sending, by the MME to the base station, a release indication that instructs release of the deleted support UE from the synthetic communication group, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

2. The method according to claim 1, wherein the determining, by an MME according to a pairing identifier of a UE, an RB of a benefited UE that performs synthetic communication and a corresponding support UE comprises:
   receiving, by the MME, a non-access stratum NAS message sent by a UE, wherein the NAS message carries a pairing identifier of the UE; and
   determining, by the MME, that UEs with a same pairing identifier are the benefited UE that performs the synthetic communication and the corresponding support UE, to further determine the RB of the benefited UE that performs the synthetic communication and the corresponding support UE.

3. The method according to claim 1, wherein the determining, by an MME according to user information of a UE, an RB of a benefited UE that performs synthetic communication and a corresponding support UE comprises:
   receiving, by the MME, an NAS message that carries a synthetic communication request and is sent by at least two UEs; and determining, by the MME according to user information of the at least two UEs, the RB of the benefited UE that performs the synthetic communication and the corresponding support UE; or
   determining, by the MME according to user information that is of all UEs and stored in the MME itself, the RB of the benefited UE that performs the synthetic communication and the corresponding support UE, wherein the user information of UE comprises at least one piece of the following information: capability information, location information, and subscription information of UE, and information about a serving base station to which UE belongs.

4. The method according to claim 1, wherein the determining, by an MME according to received synthetic communication UE information, an RB of a benefited UE that performs synthetic communication and a corresponding support UE comprises:
receiving, by the MME, the synthetic communication UE information sent by a packet data network gateway P-GW, wherein the synthetic communication UE information comprises the RB of the benefited UE that performs the synthetic communication, or the synthetic communication UE information comprises information about the RB of the benefited UE that performs the synthetic communication and about the corresponding support UE; wherein
if the synthetic communication UE information comprises information about the RB of the benefited UE that performs the synthetic communication, the MME determines, according to the user information that is of a UE and stored in the MME itself, the support UE that is corresponding to the RB of the benefited UE that performs the synthetic communication; and if the synthetic communication UE information comprises the information about the RB of the benefited UE that performs the synthetic communication and about the corresponding support UE, the MME directly determines, according to the synthetic communication UE information, the RB of the benefited UE that performs the synthetic communication and the corresponding support UE, wherein the user information comprises at least one piece of the following information: capability information, location information, and subscription information of the UE, and information about a serving base station to which the UE belongs.

5. The method according to claim 1, further comprising:
receiving, by the MME, an adding message sent by a newly-added support UE, wherein the adding message carries the synthetic communication request and the pairing identifier; determining, by the MME according to the pairing identifier, that the newly-added support UE is to be added to the corresponding synthetic communication group; and
sending, by the MME to the base station, an adding indication that instructs adding of the newly-added support UE to the synthetic communication group, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form a new synthetic communication group to perform the synthetic communication.

6. A radio bearer RB establishment method, comprising:
receiving, by a base station, synthetic communication indication information sent by a mobility management entity MME, wherein the synthetic communication indication information comprises information about an RB of a benefited user equipment UE that performs synthetic communication and about a corresponding support UE;
separately sending, by the base station, corresponding synthetic RB configuration information to the benefited UE and the support UE according to the synthetic communication indication information, and establishing a corresponding synthetic RB, thereby enabling the benefited UE and the support UE to form a synthetic communication group to perform the synthetic communication;
receiving, by the base station, a release indication that is sent by the MME and instructs release of a deleted support UE from the synthetic communication group; and
separately sending, by the base station according to the release indication, the corresponding synthetic RB configuration information to the benefited UE and the deleted support UE in the synthetic communication group, and updating or releasing the corresponding synthetic RB, thereby forming a new synthetic communication group to perform the synthetic communication.

7. The method according to claim 6, further comprising:
receiving, by the base station, an adding indication that is sent by the MME and instructs adding of a newly-added support UE to the synthetic communication group; and
separately sending, by the base station, the corresponding synthetic RB configuration information to the benefited UE in the synthetic communication group and the newly-added support UE according to the adding indication, and updating or establishing the corresponding synthetic RB, thereby enabling the newly-added support UE and the synthetic communication group to form a new synthetic communication group to perform the synthetic communication.

8. A mobility management entity MME, comprising:
a determining unit, configured to determine, according to a pairing identifier of a user equipment UE or user information of a UE or received synthetic communication UE information, a radio bearer RB of a benefited user equipment UE that performs synthetic communication and a corresponding support UE; and
a sending unit, configured to send synthetic communication indication information to a base station, wherein the synthetic communication indication information comprises information about the RB of the benefited UE that performs the synthetic communication and about the corresponding support UE, and the RB of the benefited UE that performs the synthetic communication and the corresponding support UE are determined by the determining unit, so that the base station separately sends corresponding synthetic RB configuration information to the benefited UE and the support UE according to the synthetic communication indication information, and updates or establishes a corresponding synthetic RB, thereby enabling the benefited UE and the support UE to form a synthetic communication group to perform the synthetic communication; and
a receiving unit configured to receive a release message sent by a deleted support UE, wherein the release message carries a synthetic bearer release request and the pairing identifier,
wherein the determining unit is further configured to determine the deleted support UE in the synthetic communication group according to the synthetic bearer release request and the pairing identifier that are received by the receiving unit, and the sending unit is configured to send, to the base station, a release indication that instructs release of the deleted support UE from the synthetic communication group, wherein the release is determined by the determining unit, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

9. The MME according to claim 8, further wherein,
the receiving unit is configured to receive a non-access stratum NAS message sent by a UE, wherein the NAS message carries a pairing identifier of the UE;
the determining unit is configured to determine that UEs, which are corresponding to a same pairing identifier in the pairing identifier received by the receiving unit, are the benefited UE that performs the synthetic communication and the corresponding support UE, to further determine the RB of the benefited UE that performs the synthetic communication and the corresponding support UE.

10. The MME according to claim 8, wherein,
the receiving unit is configured to receive an NAS message that carries a synthetic communication request and is sent by at least two UEs;
the determining unit is configured to determine, according to user information of the at least two UEs, the RB of the benefited UE that performs the synthetic communication and the corresponding support UE; or
the determining unit is configured to determine, according to user information that is of all UEs and stored in the determining unit itself, the RB of the benefited UE that performs the synthetic communication and the corresponding support UE, wherein the user information of UE comprises at least one piece of the following information: capability information, location information, and subscription information of UE, and information about a serving base station to which UE belongs.

11. The MME according to claim 8, wherein
the receiving unit is configured to receive the synthetic communication UE information sent by a packet data network gateway P-GW, wherein the synthetic communication UE information comprises the RB of the benefited UE that performs the synthetic communication, or the synthetic communication UE information comprises information about the RB of the benefited UE that performs the synthetic communication and about the corresponding support UE; wherein
if the synthetic communication UE information comprises the RB of the benefited UE that performs the synthetic communication, the determining unit determines, according to the user information that is of a UE and stored in the determining unit itself, the support UE that is corresponding to the RB of the benefited UE that performs the synthetic communication, wherein the RB of the benefited UE is comprised in the synthetic communication UE information received by the receiving unit; and if the synthetic communication UE information comprises the information about the RB of the benefited UE that performs the synthetic communication and about the corresponding support UE, the MME directly determines, according to the synthetic communication UE information received by the receiving unit, the RB of the benefited UE that performs the synthetic communication and the corresponding support UE, wherein the user information comprises at least one piece of the following information: capability information, location information, and subscription information of the UE, and information about a serving base station to which the UE belongs.

12. The MME according to claim 8, wherein:
the receiving unit is further configured to receive an adding message sent by a newly-added support UE, wherein the adding message carries the synthetic communication request and the pairing identifier; and the MME determines, according to the pairing identifier, that the newly-added support UE is to be added to the corresponding synthetic communication group;
the determining unit is further configured to determine, according to the pairing identifier received by the receiving unit, that the newly-added support UE is to be added to the corresponding synthetic communication group; and
the sending unit is configured to send, to the base station, an adding indication that instructs adding of the newly-added support UE to the synthetic communication group, wherein the adding is determined by the determining unit, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form a new synthetic communication group to perform the synthetic communication.

13. The MME according to claim 12, wherein:
the determining unit is further configured to determine, according to user information that is of the newly-added support UE and stored in the determining unit itself, that the newly-added support UE is to be added to the corresponding synthetic communication group, wherein the user information comprises at least one piece of the following information: capability information, location information, and subscription information of the UE, and information about a serving base station to which the UE belongs; and
the sending unit is configured to send, to the base station, the adding indication that instructs adding of the newly-added support UE to the synthetic communication group, wherein the adding is determined by the determining unit, so that the base station separately sends, according to the adding indication, the corresponding synthetic RB configuration information to the benefited UE in the synthetic communication group and the newly-added support UE, and updates or establishes the corresponding synthetic RB, thereby enabling the newly-added support UE and the synthetic communication group to form the new synthetic communication group to perform the synthetic communication.

14. The MME according to claim 8, wherein:
the determining unit is configured to determine, according to user information that is of the deleted support UE and stored in the determining unit itself, that the deleted support UE is to be released from the synthetic communication group, wherein the user information comprises at least one piece of the following information: capability information, location information, and subscription information of the UE, and information about a serving base station to which the UE belongs; and the sending unit is configured to send, to the base station, the release indication that instructs release of the deleted support UE from the synthetic communication group, wherein the release is determined by the determining unit, so that the base station separately sends, according to the release indication, the corresponding synthetic RB information to the benefited UE and the deleted support UE in the synthetic communication group, and updates or releases the corresponding synthetic RB, thereby forming a new synthetic communication group in which the deleted support UE is released, to perform the synthetic communication.

15. A base station, comprising:

a receiving unit, configured to receive synthetic communication indication information sent by a mobility management entity MME, wherein the synthetic communication indication information comprises information about an RB of a benefited user equipment UE that performs synthetic communication and about a corresponding support UE;

a configuring unit, configured to separately configure corresponding synthetic radio bearer RB configuration information for the benefited UE and the support UE according to the synthetic communication indication information received by the receiving unit; and a sending unit, further configured to separately send the corresponding synthetic RB configuration information, which is configured by the configuring unit, to the benefited UE and the support UE, and establish a corresponding synthetic RB, thereby enabling the benefited UE and the support UE to form a synthetic communication group to perform the synthetic communication;

wherein:

the receiving unit is further configured to receive a release indication that is sent by the MME and instructs release of a deleted support UE from the synthetic communication group;

the configuring unit is further configured to separately configure, according to the release indication received by the receiving unit, the corresponding synthetic RB configuration information for the benefited UE and the deleted support UE in the synthetic communication group; and the sending unit is further configured to separately send the corresponding synthetic RB configuration information, which is configured by the configuring unit, to the benefited UE and the deleted support UE in the synthetic communication group, and update or release the corresponding synthetic RB, thereby forming a new synthetic communication group to perform the synthetic communication.

16. The base station according to claim 15, wherein:

the receiving unit is further configured to receive an adding indication that is sent by the MME and instructs adding of a newly-added support UE to the synthetic communication group;

the configuring unit is further configured to separately configure, according to the adding indication received by the receiving unit, the corresponding synthetic RB configuration information for the benefited UE and the support UE in the synthetic communication group and the newly-added support UE; and the sending unit is further configured to separately send the corresponding synthetic RB configuration information, which is configured by the configuring unit, to the benefited UE and the support UE in the synthetic communication group and the newly-added support UE, and update or establish the corresponding synthetic RB, thereby enabling the newly-added support UE and the synthetic communication group to form a new synthetic communication group to perform the synthetic communication.

* * * * *